(12) United States Patent
Ootsuki

(10) Patent No.: US 7,245,288 B2
(45) Date of Patent: Jul. 17, 2007

(54) METHOD OF SETTING UP POINTING DEVICE ON PORTABLE TERMINAL

(75) Inventor: Michihito Ootsuki, Tokyo (JP)

(73) Assignee: NEC Corporation, Tokyo (JP)

( * ) Notice: Subject to any disclaimer, the term of this patent is extended or adjusted under 35 U.S.C. 154(b) by 288 days.

(21) Appl. No.: 10/453,579

(22) Filed: Jun. 4, 2003

(65) Prior Publication Data

US 2003/0227444 A1    Dec. 11, 2003

(30) Foreign Application Priority Data

Jun. 10, 2002    (JP)    ............................. 2002-168904

(51) Int. Cl.
*G09G 5/08*    (2006.01)
(52) U.S. Cl. ................... 345/159; 345/157; 345/158
(58) Field of Classification Search ........ 345/156–184; 348/180; 434/155
See application file for complete search history.

(56) References Cited

U.S. PATENT DOCUMENTS 5,526,023 A * 6/1996 Sugimoto et al. ........... 345/173
5,999,213 A * 12/1999 Tsushima et al. ........... 348/180
6,485,306 B1 * 11/2002 Yeh ............................. 434/155
6,690,357 B1 * 2/2004 Dunton et al. ............... 345/158

FOREIGN PATENT DOCUMENTS

| EP | 0 390 031 A3 | | 10/1990 |
| JP | 9-34643 | | 2/1997 |
| JP | 9-34644 | | 2/1997 |
| JP | 11-73275 | | 3/1999 |
| JP | 2000-322188 | | 11/2000 |
| JP | 2000-347800 | | 12/2000 |
| WO | WO 96/24923 | * | 8/1996 |
| WO | WO 99/32958 | | 7/1999 |

\* cited by examiner

*Primary Examiner*—Sumati Lefkowitz
*Assistant Examiner*—Srilakshmi K Kumar
(74) *Attorney, Agent, or Firm*—Whitham, Curtis, Christofferson & Cook, PC

(57) ABSTRACT

A method of setting up a pointing device on a portable terminal according to the present invention has a first step for moving a user icon on a display unit of the portable terminal by the pointing device to follow a target icon, and a second step for acquiring parameters associated with the pointing device based on user icon movement information generated by the first step.

6 Claims, 2 Drawing Sheets

METHOD OF SETTING UP POINTING DEVICE ON PORTABLE TERMINAL

BACKGROUND OF THE INVENTION

1. Field of the Invention

The present invention relates to a computer terminal, and more particularly, to a method of setting up a pointing device on a portable terminal, a program for executing this method, and a portable terminal.

2. Description of the Related Art

Conventionally, pointing devices have been provided for use with relatively large devices such as personal computers. This type of device is configured to have the ability to ensure an absolute amount of sufficiently large movements for the pointing device. Also, this type of device has sufficiently high software performance, a sufficient capacity of memory, and the like.

Therefore, in a pointing device associated with this type of device, variations in optimal parameter values related to a moving amount of the moving pointing device are sufficiently small as compared with the absolute movable range. For this reason, this type of device can absorb, to some extent, delicate variations in usage on a user-by-user basis. Also, this type of device can perform complicated processing for optimizing parameters of the pointing device, even in adjustments to delicate variations in usage on a user-by-user basis without relying on the users for the adjustments because of a large capacity of memory and high performance possessed thereby. Further, since users of this type of device usually have abundant knowledge of software, it is often the case that the users can adjust delicate parameters by themselves.

However, portable terminals such as a portable telephone are used not only by those users who have abundant knowledge of software but also by users in all walks of life. Therefore, a complicated method cannot be employed in portable terminals for adjusting optimal parameters related to a moving amount of the pointing device. Also, since the portable devices cannot ensure a sufficient movable range for the pointing device due to their small size, the portable terminals tend to be deeply affected by an assembling tolerance and a particular manner in which each user uses them.

SUMMARY OF THE INVENTION

It is an object of the present invention to provide a method of setting up a pointing device on a portable terminal, which can permit a user to optimize parameters with a minimum adjusting work, and a portable terminal.

To achieve the above object, a method of setting up a pointing device prompts the user to move a user icon to follow a target icon on a display unit of the portable terminal through the pointing device to acquire parameters associated with the pointing device based on user icon movement information.

Thus, the parameters can be optimized without burdening the user with delicate parameter adjustments in a small portable terminal which provides only a narrow absolute movable range for a pointing device and therefore tends to be deeply affected by variations in housing, and variations in usage on a user-by-user basis. Also, in the portable terminal, even if parameters upon shipment are affected by aging and the like, the parameters can be again restored to optimal values.

Also, since the portable terminal need not perform complicated software control such as a learning function, the portable terminal permits the user to consistently set up the pointing device without increasing the scale of software.

Further, a pointing device setup operation graphically provided by the portable terminal enables a particular user to optimally set up the pointing device, even if the user is not highly skilled in software art.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
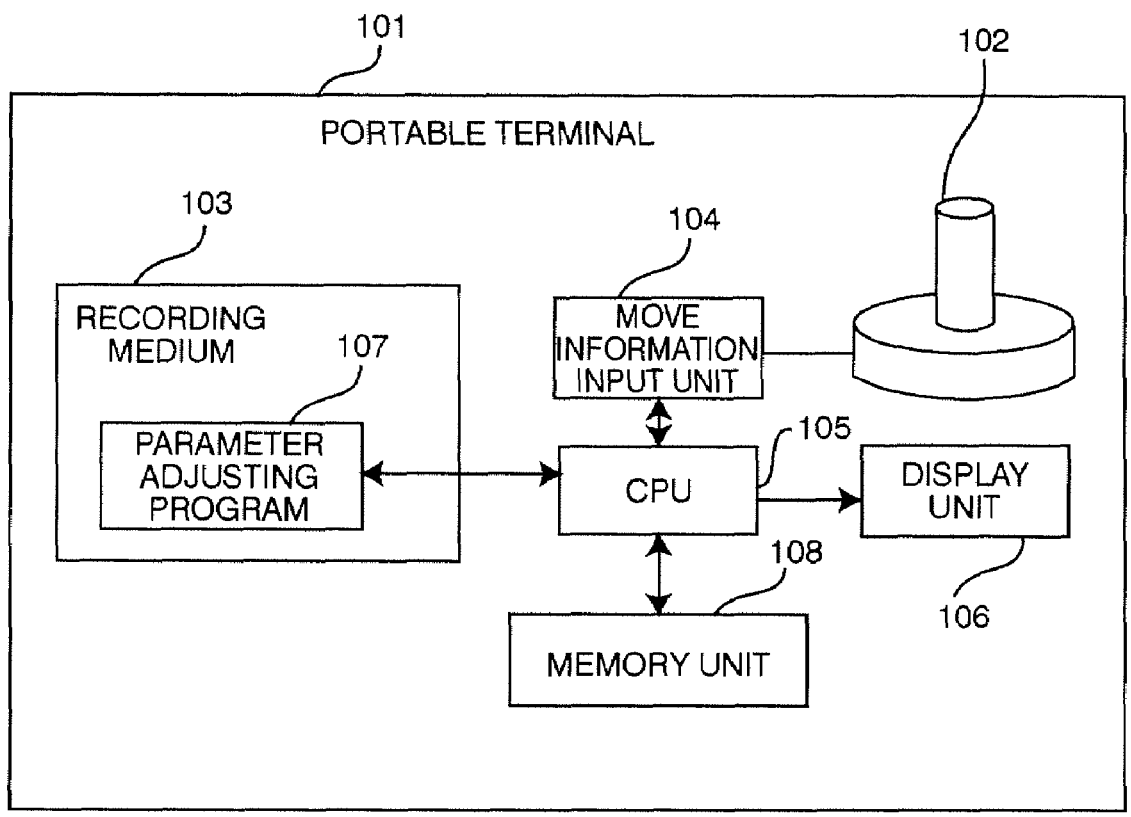
FIG. 1 is a block diagram illustrating the arrangement of a portable terminal according to one embodiment of the present invention.

Referring to FIG. 1, portable terminal 101 according to one embodiment of the present invention comprises pointing device 102; a computer (hereinafter called "CPU") 105 which serves as control means; recording medium 103 readable by CPU 105 for recording parameter adjusting program 107 which is executed by CPU 105 for adjusting a variety of parameters; memory unit 108 for storing parameters adjusted by CPU 105, and the like; display unit 106 for guiding parameter adjustment manipulations; and move information input unit 104 for supplying move information from pointing device 102 to CPU 105.

Figure 2:
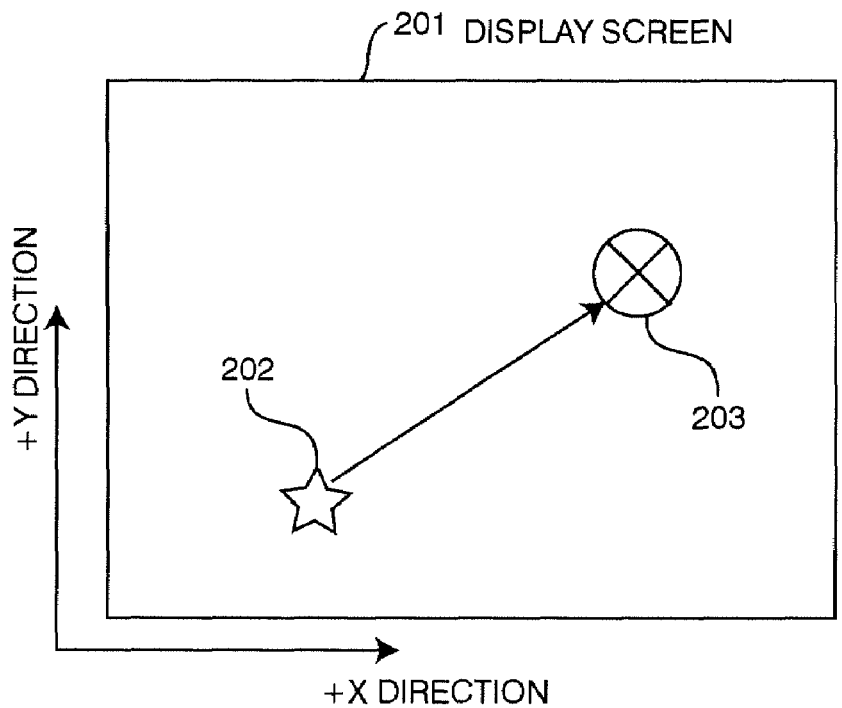
FIG. 2 is a diagram illustrating a parameter adjusting screen in one embodiment of the present invention.

For adjusting parameters of pointing device 102 on portable terminal 101, CPU 105 displays a message which prompts the user to manipulate pointing device 102 to move user icon 202 (see FIG. 2) toward target icon 203 (see FIG. 2) on display unit 106. Subsequently, CPU 105 displays a parameter adjusting screen as illustrated in FIG. 2 on display screen 201.

In this embodiment, three different moving speeds (low/normal/high) in stages are available for moving pointing device 102 in accordance with an amount by which pointing device 102 is moved. Also, parameters associated with pointing device 102 include eight levels of threshold information for changing a speed in each of X- and Y-directions, four ranges of maximum movable amount information for changing a speed in each of X- and Y-directions, and four values of variations information in an orthogonal direction during a translation in each of X- and Y-directions.

Specifically, pointing device 102 has a parameter related to each of four directions from the origin. The eight levels of threshold information indicate two thresholds for +X-direction, −X-direction, +Y-direction and −Y-direction, respectively. Similarly, four ranges of maximum movable amount information indicate four maximum movable amounts for the +X-direction, −X-direction, +Y-direction and −Y-direction, respectively.

CPU 105 moves target icon 203 based on parameter adjusting program 107 recorded on recording medium 103. Subsequently, CPU 105 waits for user icon 202 to move toward target icon 203 in response to a manipulation performed by the user on pointing device 102.

CPU 105 runs parameter adjusting program 107 to specify, for the location of target icon 203, a position away from user icon 202, a position near user icon 202, a position with a varying positional relationship with user icon 202 in the vertical and horizontal directions, and the like.

Move information input unit 104 supplies CPU 105 with information on a moving amount of pointing device 102.

CPU 105 samples the moving amount of pointing device 102 when the user moves user icon 202 toward target icon 203, determines a parameter value corresponding to the moving amount of pointing device 102 based on parameter adjusting program 107, and stores the determined parameter value in memory unit 108.

After the foregoing operation is performed for a certain time period, CPU 105 acquires parameter information related to pointing device 102 which is determined based on the packaging condition of a housing, aging, and a particular manner of use inherent to the user. The parameter information includes moving amounts (thresholds) of pointing device 102 when it is moved at high/low speeds, deviations on the coordinates when pointing device 102 is moved up and down and to the left and right, and upward, downward, leftward and rightward maximum movable amounts of pointing device 102.

Figure 3:
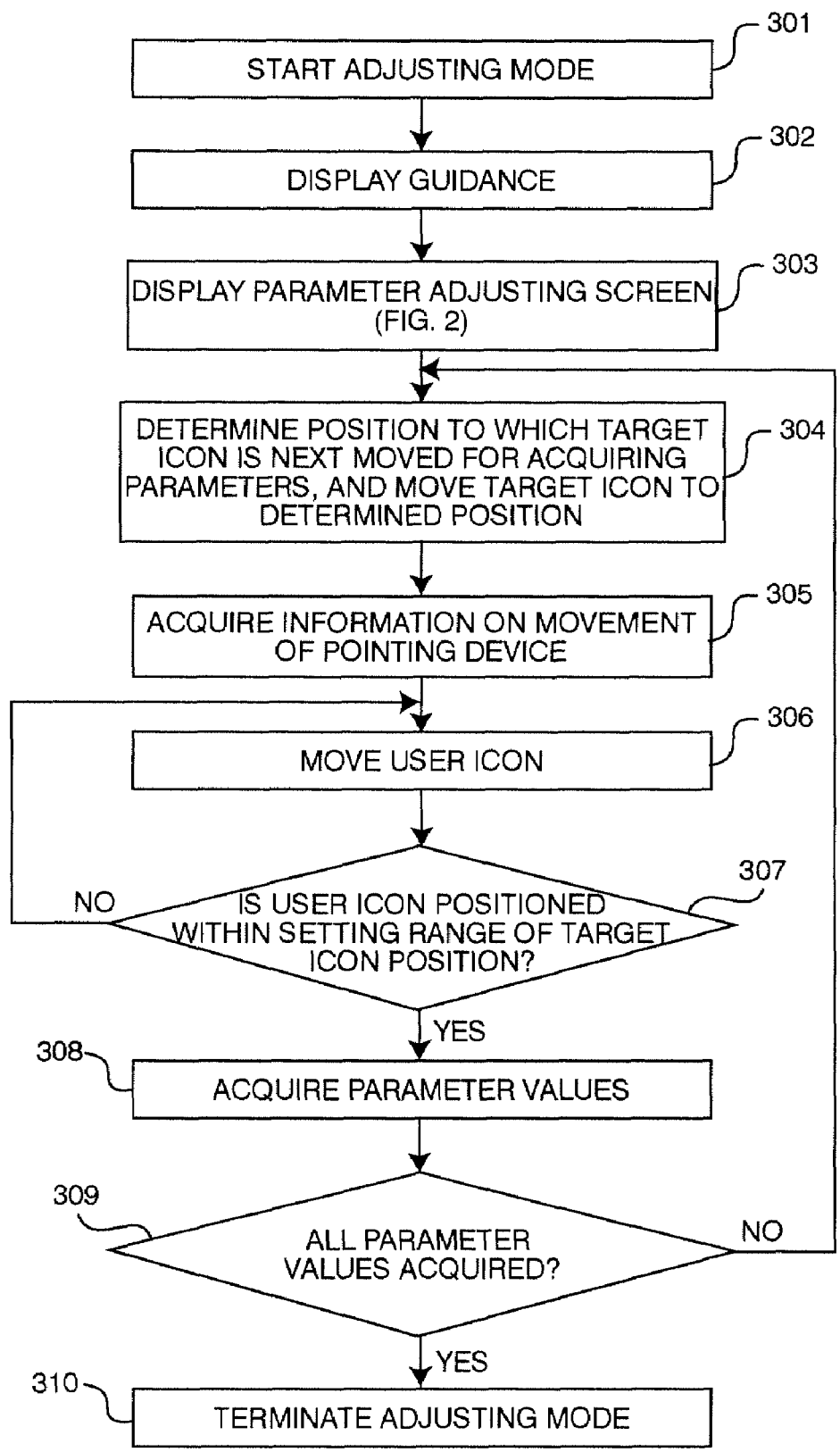
FIG. 3 is a flow chart illustrating a parameter adjusting procedure according to one embodiment of the present invention.

Next, the operation during a parameter adjustment in this embodiment will be described with reference to FIG. 3.

At step 301, CPU 105 enters a parameter adjusting mode for pointing device 102. Next, at step 302, CPU 105 displays a message which prompts the user to move user icon 202 following target icon 203.

Next, at step 303, CPU 105 displays the parameter adjusting screen as illustrated in FIG. 2. Next, at step 304, CPU 105 acquires information on a position to which target icon 203 is next moved based on parameter adjusting program 107, and displays target icon 203. In FIG. 2, target icon 203 is located at a remote point at an angle of 45 degrees to the right. CPU 105 waits for the user to manipulate pointing device 102.

At step 305, when pointing device 102 is manipulated by the user, CPU 105 acquires information on a moving amount of pointing device 102 from move information input unit 104.

Next, at step 306, CPU 105 moves user icon 202 to a destination in accordance with the moving amount of pointing device 102 at a predetermined moving speed (dictated by the foregoing parameter values in this embodiment).

At step 307, CPU 105 determines whether user icon 202 has approached a set range for target icon 203. When user icon 202 has approached the set range for target icon 203, CPU 105 samples the moving amount of pointing device 102, and acquires a parameter corresponding to the sampled data value based on parameter adjusting program 107, and stores the parameter in memory unit 108 at step 308. In the example illustrated in FIG. 2, CPU 105 acquires threshold parameters associated with three different moving speeds in the +X and +Y-directions; X-direction and Y-direction deviation parameters in the orthogonal direction during the translations in +X- and +Y-directions, respectively; and X-direction and Y-direction maximum movable amount parameters.

Next, CPU 105 determines at step 309 whether or not all parameters have been acquired, and again moves target icon 203, if any parameter(s) has not been acquired for a particular item(s), in order to acquire the parameter(s). Subsequently, upon complete acquisition of all parameters, CPU 105 terminates the parameter adjusting mode at step 310.

While, in the foregoing embodiment, CPU 105 attempts to acquire the parameters after the user icon 202 has been moved to the vicinity of target icon 203, the parameters may be acquired at any time.

Also, the condition set at step 307 may be used to determine whether or not the user has depressed a decision button.

While preferred embodiments of the present invention have been described using specific terms, such description is for illustrative purpose only, and it is to be understood that changes and variations may be made without departing from the spirit or scope of the following claims.

What is claimed is:

1. A method of setting up a pointing device on a portable terminal comprising:

a first step for displaying a target icon on display means of said portable terminal, moving a user icon on said display means by said pointing device to follow said target icon; and a second step for acquiring parameters associated with said pointing device based on user icon movement information generated by the movement of said pointing device after said first step, said parameters including moving speed in accordance with an amount by which said pointing device is moved.

2. The method according to claim 1, wherein:

said first step and said second step are repeated a number of times while changing the position at which said target icon is displayed in said first step.

3. A computer-readable medium encoded with a program for setting up a pointing device on a portable terminal performing the following steps:

a first step for displaying a target icon on display means of said portable terminal, moving a user icon on said display means by said pointing device to follow said target icon; and a second step for acquiring parameters associated with said pointing device based on user icon movement information generated by the movement of said pointing device after said first step, said parameters including moving speed in accordance with an amount by which said pointing device is moved.

4. A computer-readable medium encoded with the program according to claim 3, wherein:

said first step and said second step are repeated a number of times while changing the position at which said target icon is displayed in said first step.

5. A portable terminal comprising:

a pointing device;

display means; and control means for displaying a target icon on said display means, moving a user icon on said display means by said pointing device to follow said target icon, and acquiring parameters associated with said pointing device based on user icon movement information generated by the movement of said pointing device, said parameters including moving speed in accordance with an amount by which said pointing device is moved.

6. The portable terminal according to claim 5, wherein:

said control means repeats a number of times the operation of acquiring the parameters associated with said pointing device based on the user icon movement information generated by the movement of said pointing device while changing the position at which said target icon is displayed.

* * * * *